July 8, 1924.                                                    1,500,138
G. R. LE MAIRE
SHOCK ABSORBER
Filed Feb. 19, 1923      2 Sheets-Sheet 1

George R. LeMaire
INVENTOR

BY *Victor J. Evans*
ATTORNEY

WITNESS:

July 8, 1924.

1,500,138

G. R. LE MAIRE

SHOCK ABSORBER

Filed Feb. 19, 1923    2 Sheets-Sheet 2

George R. LeMaire
INVENTOR

BY Victor J. Evans
ATTORNEY

J. E. Cole
WITNESS:

Patented July 8, 1924.

1,500,138

UNITED STATES PATENT OFFICE.

GEORGE ROBERT LE MAIRE, OF CENTRAL CITY, KENTUCKY.

SHOCK ABSORBER.

Application filed February 19, 1923. Serial No. 620,021.

*To all whom it may concern:*

Be it known that I, GEORGE ROBERT LE MAIRE, a citizen of the United States, residing at Central City, in the county of Muhlenberg and State of Kentucky, have invented new and useful Improvements in Shock Absorbers, of which the following is a specification.

The object of this invention is to produce a shock absorbing means for vehicles by the use of which both the shock and the rebound of the springs after the shock is effectively absorbed.

A further object is to produce a fluid controlled shock absorbing means for vehicles that shall be simple in construction, readily applied and which will perform its functions with ease and with accuracy.

To the attainment of the foregoing and other objects which will present themselves as the nature of the invention is better understood, reference is to be had to the drawings which accompany and which form part of this application.

In the drawings:—

Figure 1:
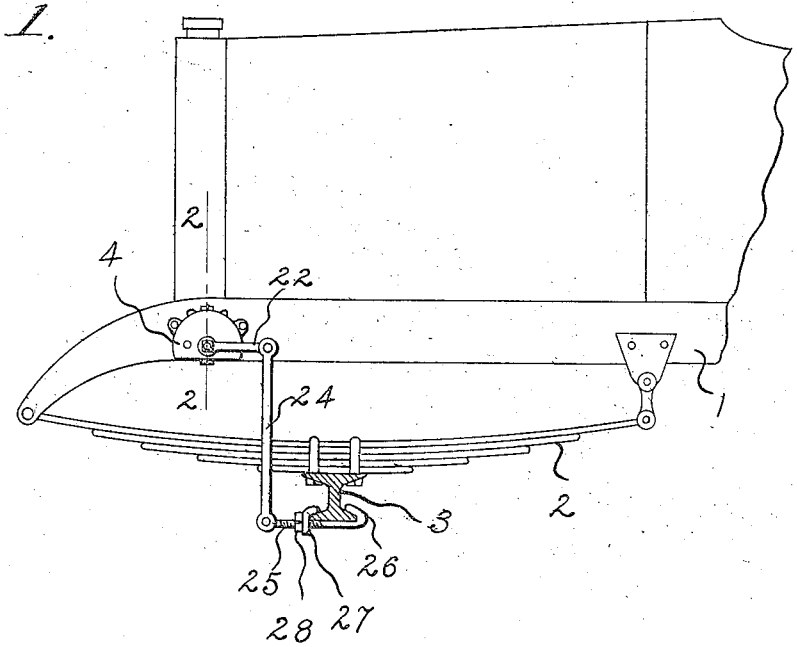
Figure 1 is a side elevation of a sufficient portion of a vehicle to illustrate the application of the improvement thereon.
Figure 2:
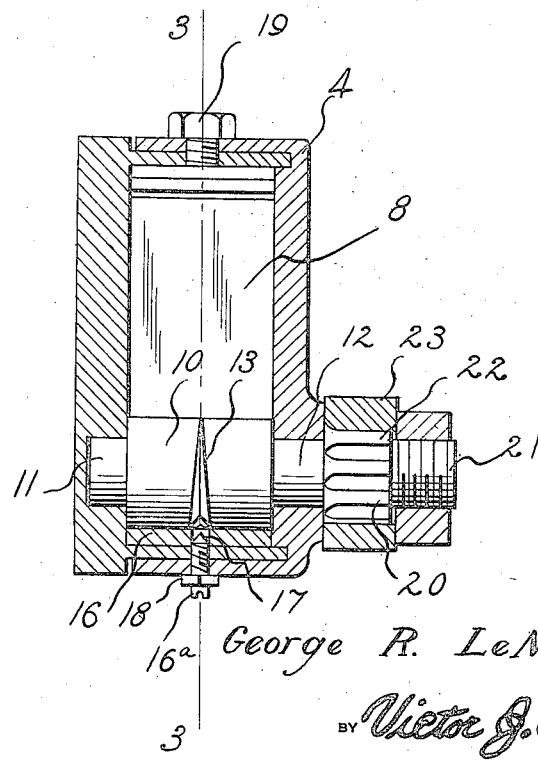
Figure 2 is a sectional view approximately on the line 2—2 of Figure 1, on an enlarged scale.

Referring now to the drawings in detail, the numeral 1 designates one of the side bars of the frame of an automobile or similar vehicle, and 2 a leaf spring connected to the bar 1 and to which the axle 3 is secured.

It is to be understood that a shock absorber in accordance with my invention is to be attached to the front and rear axles of the machine to the sides of the springs to which the axles are connected.

Each section of the casing 4 includes an outer straight face, a flat base and an upwardly arched connecting wall between the side and the ends of the base. The casing sections have their confronting walls provided with interengaging portions, as clearly disclosed by the drawings, and the said sections are provided with ears designed to align whereby securing elements may pass for holding the sections connected. Between the interengaging portions of the casing sections there are suitable packings. One of the sections is provided with additional ears which, for distinction, are indicated by the numeral 7, and through these ears there are passed bolts or analogous means that secure the casing 4 to the bar 1 to one side of the axle 3.

In the casing there is what I will term a fluid reservoir and impeller, the same, in reality, being in the nature of a hollow blade which is indicated by the numeral 8. The body of this member is substantially V-shaped in elevation and the top of the same is rounded to snugly contact with the rounded inner wall of the casing. The top of the member 8 is provided with an opening whereby an oil or similar fluid whose level is indicated in the drawings by the numeral 9, may be received therein. The bottom of the member 8 is in the nature of a cross sectionally rounded block 10, the ends of which being provided with reduced trunnions 11 and 12 which find bearings in the opposed walls of the casing 4. The portion 10 of the member 8 is in reality in the nature of a solid hub and will, for the sake of convenience, be so referred to. The hub 10, from one face of the member 8 is formed with a substantially V-shaped groove 13 extending from one of its sides and gradually deepening and terminating in a shoulder 14 arranged at the base but near the opposite side of the said member 8. From the shoulder the hub 10 is formed with a similar groove 15, which, however, is of a less depth than the groove 13, the groove 15 terminating in a line with one side or face of the impeller member 8.

The hub finds a bearing on a block 16 arranged and secured centrally on the base of the casing 5, and passing through the bottom of the casing and through said hub there is a threaded element 16ª having a pointed end 17 to be received in either of the grooves 13 or 15. The element 16ª has screwed thereon a nut 18 for regulating the position of its pointed end in the grooves of the hub 10.

The casing 4 is centrally provided on its top with a fluid inlet opening that is normally closed by a removable plug 19.

Secured on the trunnion 16 that passes through its bearing opening in the outer wall of the casing 4, or integrally formed therewith when a shaft is keyed in the hub 10, when the latter is bored there is a sleeve 20 that has peripheral grooves, the trunnion 12 having the end thereof projecting beyond the sleeve threaded, as at 21. The sleeve 20 is received through the ribbed bore 22 of a link 23. When the link is so positioned there is screwed on the threaded end 21 of the shaft or trunnion 12 a nut, suitable means, such as a cotter pin passing through a suitable opening in the said portion 23 to contact with the nut to prevent the unscrewing thereof.

To the outer end of the link 23 there is pivotally connected an arm 24, the said arm having its lower end pivoted or otherwise loosely connected with the threaded shank 25 of a hook 26, the beak of the hook engaging with the lower and inner flange of the I beam that constitutes the axle 3. On the shank 25 there is arranged the angle body portion of a second hook 27, and screwed upon the shank 25 and contacting with the body of the said hook 27 there is a nut 28. Suitable locking means is provided for the nut so that the hook 27 will engage with the outer lower flange of the axle 3.

Figure 3:
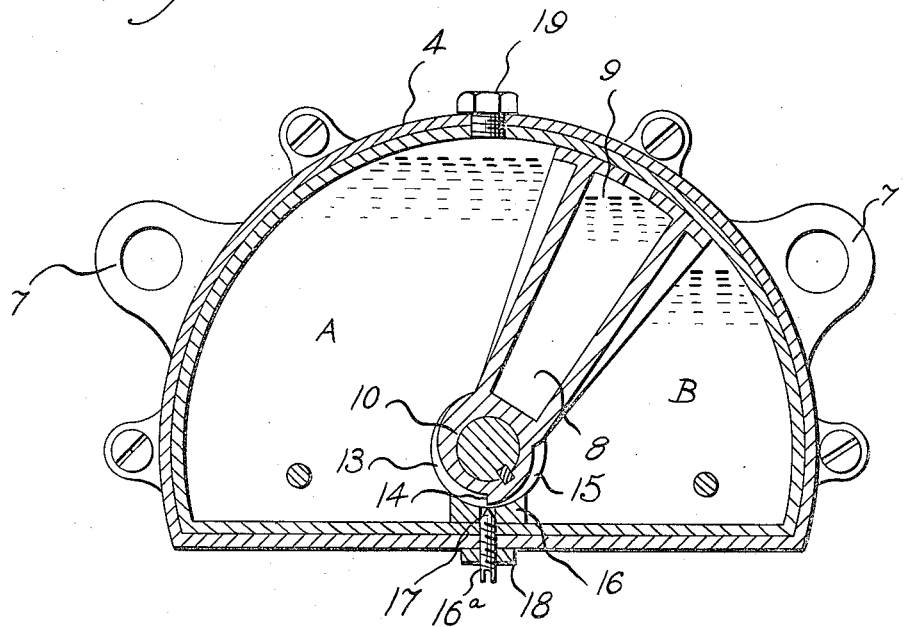
Figure 3 is a sectional view on the line 3—3 of Figure 2.
Figure 4:
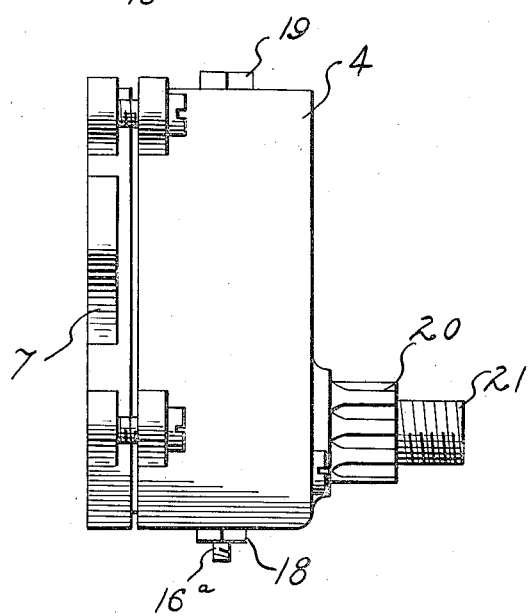
Figure 4 is an end view of the casing of the improvement.

In the arrangement of parts as disclosed in Figure 3 of the drawings the member 8 is in normal position, and for distinction the parts of the casing to the opposite sides of the member 8 provide compartments which are indicated by the characters A and B respectively. When the car meets with an obstruction the member 8 moves upwardly in the casing from the compartment B into the compartment A, and as the link 23 is connected directly to the member 8 the same will be also moved, forcing the oil from the compartment A into the compartment B, through the V-shaped passage in the bottom of the hub 10 of the member 8. The greater the swing of the link, the greater the reduction in the size of the passage 13 between the compartments A and B so that shock in this direction will be absorbed. On the down stroke of the arm 24 the member 3 is returned to initial position, forcing the oil from the compartment B through the comparatively small passage 15 into the compartment A so that the rebound shock is also effectively compensated for.

The improvement is of a simple nature, may be readily attached to any ordinary vehicle spring, and the construction and operation will, it is believed, be apparent from the foregoing description. It is to be stated, however, that I do not wish to be restricted to the precise structural details herein set forth but hold myself entitled to all such changes therefrom as fall within the scope of what I claim.

Having described the invention, I claim:—

The combination with a vehicle frame and a spring supported wheel carrying axle thereon, of a shock absorber including a casing having a flat base and a rounded top secured to the frame, a block having an upper hollow face arranged centrally on the base of the casing, a hollow blade in the casing in contact with the side and top walls thereof, a hub on the blade resting in the concaved face of the block and having trunnions journaled one in the side and one through the opposite side of the casing, normally closed means for admitting a fluid into the casing to the opposite sides of the blade, spaced grooves on the hub to establish fluid communications in the casing to either side of the blade when the blade is moved to certain positions and to prevent such passage of fluid when the blade is in another position, means adjustable on the block and entering one of the grooves for regulating the passage of fluid through said grooves, and means carried by the axle and connected to the projecting trunnion of the blade for swinging the blade when the axle is subjected to vertical movement by shocks or jars.

In testimony whereof I affix my signature.

GEORGE ROBERT LE MAIRE.